(12) United States Patent
Hunter et al.

(10) Patent No.: US 7,623,436 B2
(45) Date of Patent: Nov. 24, 2009

(54) HIGH CAPACITY DIGITAL DATA STORAGE BY TRANSMISSION OF RADIANT ENERGY THROUGH ARRAYS OF SMALL DIAMETER HOLES

(76) Inventors: Charles Eric Hunter, 7 Grey Widgeon, Hilton Head Island, SC (US) 29928; Bernard L. Ballou, Jr., 11404 Blackbrook Ct., Raleigh, NC (US) 27614; John H. Hebrank, 216 Jefferson Dr., Durham, NC (US) 27712; Laurie McNeil, Department of Physics-Astronomy, University of North Carolina Hill, Phillips Hall CB #3255, Chapel Hill, NC (US) 27599-3255

( * ) Notice: Subject to any disclaimer, the term of this patent is extended or adjusted under 35 U.S.C. 154(b) by 43 days.

(21) Appl. No.: 11/370,758

(22) Filed: Mar. 8, 2006

(65) Prior Publication Data

US 2006/0164962 A1   Jul. 27, 2006

Related U.S. Application Data

(63) Continuation of application No. 10/082,928, filed on Oct. 19, 2001, now Pat. No. 7,054,256.

(60) Provisional application No. 60/242,042, filed on Oct. 20, 2000.

(51) Int. Cl.
*G11B 7/00*   (2006.01)

(52) U.S. Cl. .................... 369/120; 369/275.1; 369/286; 369/283

(58) Field of Classification Search ........................ None
See application file for complete search history.

(56) References Cited

U.S. PATENT DOCUMENTS 3,373,517 A    3/1968   Halperin ...................... 40/491

(Continued)

FOREIGN PATENT DOCUMENTS

EP          0 683 943 B1    11/1993

(Continued)

OTHER PUBLICATIONS

"About us," http://www.egghead.com/ShowPage.dll?page+hd_aboutus_p, downloaded Sep. 29, 2001.

(Continued)

*Primary Examiner*—Wayne R Young
*Assistant Examiner*—Van N Chow
(74) *Attorney, Agent, or Firm*—Woodcock Washburn LLP

(57) ABSTRACT

A storage media for storage of data thereon is provided. The storage media including: a first layer, the first layer being substantially transparent to a predetermined radiant energy used for reading the data; and a second layer formed on the first layer and being substantially opaque to the radiant energy, the second layer having a pattern comprising a plurality of holes, each of the holes having a largest dimension which is greater than a wavelength of the radiant energy, the data being stored as the presence or absence of a hole in the pattern. Also provided are a method for fabricating the storage media as well as an apparatus and method for reading the data stored on the storage media.

34 Claims, 4 Drawing Sheets

U.S. PATENT DOCUMENTS

| | | | |
|---|---|---|---|
| 3,376,465 A | 4/1968 | Corpew ........................ 315/10 |
| 3,665,483 A * | 5/1972 | Becker et al. ............... 347/262 |
| 3,848,193 A | 11/1974 | Martin et al. ................. 325/53 |
| 3,941,926 A | 3/1976 | Slobodzian et al. .......... 178/7.3 |
| 3,983,317 A | 9/1976 | Glorioso ..................... 178/6.6 |
| 3,993,955 A | 11/1976 | Belcher et al. ............... 325/308 |
| 4,094,010 A | 6/1978 | Pepperl et al. .............. 365/215 |
| 4,155,042 A | 5/1979 | Permut et al. ................. 325/64 |
| 4,332,022 A | 5/1982 | Ceshkovsky et al. .......... 369/44 |
| 4,357,616 A | 11/1982 | Terao et al. |
| 4,368,485 A | 1/1983 | Midland ...................... 358/64 |
| 4,476,488 A | 10/1984 | Merrell ........................ 358/86 |
| 4,536,791 A | 8/1985 | Campbell et al. ........... 358/122 |
| 4,559,480 A | 12/1985 | Nobs ........................... 315/324 |
| 4,575,750 A | 3/1986 | Callahan ..................... 358/86 |
| 4,595,950 A | 6/1986 | Lofberg ...................... 358/122 |
| 4,611,351 A | 9/1986 | Nakamura |
| 4,638,335 A | 1/1987 | Smith et al. |
| 4,654,482 A | 3/1987 | DeAngelis ................... 379/95 |
| 4,716,410 A | 12/1987 | Nozaki .................. 340/825.52 |
| 4,734,779 A | 3/1988 | Levis et al. ................. 358/231 |
| 4,734,858 A | 3/1988 | Schlafly ..................... 364/408 |
| 4,761,641 A | 8/1988 | Schreiber ................... 340/717 |
| 4,797,913 A | 1/1989 | Kaplan et al. ................ 379/91 |
| 4,812,843 A | 3/1989 | Champion, III et al. ..... 340/905 |
| 4,829,569 A | 5/1989 | Seth-Smith et al. ........... 380/10 |
| 4,847,825 A | 7/1989 | Levine ........................ 369/47 |
| 4,862,268 A | 8/1989 | Campbell et al. ........... 358/141 |
| 4,908,713 A | 3/1990 | Levine ........................ 358/335 |
| 4,949,187 A | 8/1990 | Cohen ........................ 358/335 |
| 4,961,884 A | 10/1990 | Watanabe et al. ............ 264/106 |
| 5,039,578 A * | 8/1991 | Appelbaum et al. ......... 428/704 |
| 5,046,090 A | 9/1991 | Walker et al. ................. 380/5 |
| 5,051,822 A | 9/1991 | Rhoades ..................... 358/86 |
| 5,073,925 A | 12/1991 | Nagata et al. ................. 380/3 |
| 5,107,107 A | 4/1992 | Osborne ................. 250/231.14 |
| 5,121,430 A | 6/1992 | Ganzer et al. ................ 380/48 |
| 5,123,046 A | 6/1992 | Levine ........................ 380/10 |
| 5,133,079 A | 7/1992 | Ballantyne et al. ............ 455/4.1 |
| 5,182,669 A * | 1/1993 | Chikuma et al. ............ 359/241 |
| 5,191,573 A | 3/1993 | Hair ............................ 369/84 |
| 5,214,793 A | 5/1993 | Conway et al. ............. 455/49.1 |
| 5,233,423 A | 8/1993 | Jernigan et al. ............. 358/181 |
| 5,235,587 A | 8/1993 | Bearden et al. ............. 369/106 |
| 5,251,193 A | 10/1993 | Nelson et al. ............ 369/44.12 |
| 5,257,017 A | 10/1993 | Jones et al. ................... 345/13 |
| 5,260,778 A | 11/1993 | Kauffman et al. ............. 358/86 |
| 5,274,762 A | 12/1993 | Peterson et al. ............. 395/200 |
| 5,283,731 A | 2/1994 | LaLonde et al. ............. 364/401 |
| 5,297,204 A | 3/1994 | Levine ........................ 380/10 |
| 5,311,423 A | 5/1994 | Clark ......................... 364/401 |
| 5,319,735 A | 6/1994 | Preuss et al. ............... 395/2.14 |
| 5,355,302 A | 10/1994 | Martin et al. ............... 364/410 |
| 5,365,282 A | 11/1994 | Levine ........................ 348/734 |
| 5,373,330 A | 12/1994 | Levine ........................ 348/734 |
| 5,414,756 A | 5/1995 | Levine ........................ 379/67 |
| 5,418,713 A | 5/1995 | Allen ......................... 364/403 |
| 5,420,647 A | 5/1995 | Levine ........................ 348/734 |
| 5,420,923 A | 5/1995 | Beyers, II et al. ............. 380/20 |
| 5,428,606 A | 6/1995 | Moskowitz ................... 370/60 |
| 5,465,291 A | 11/1995 | Barrus et al. ................. 379/67 |
| 5,469,020 A | 11/1995 | Herrick ...................... 313/511 |
| 5,473,584 A | 12/1995 | Oshima ...................... 369/32 |
| 5,486,819 A | 1/1996 | Horie ......................... 340/905 |
| 5,495,283 A | 2/1996 | Cowe ......................... 348/9 |
| 5,497,186 A | 3/1996 | Kawasaki ..................... 348/6 |
| 5,497,479 A | 3/1996 | Hornbuckle ................ 395/491 |
| 5,508,815 A | 4/1996 | Levine ........................ 358/335 |
| 5,512,935 A | 4/1996 | Majeti et al. ................. 348/9 |
| 5,513,260 A | 4/1996 | Ryan .......................... 380/3 |
| 5,530,751 A | 6/1996 | Morris ......................... 380/4 |
| 5,532,920 A | 7/1996 | Hartrick et al. ........... 364/419.1 |
| 5,543,856 A | 8/1996 | Rosser et al. ............... 348/578 |
| 5,557,541 A | 9/1996 | Schulhof et al. ............ 364/514 |
| 5,559,549 A | 9/1996 | Hendricks et al. ............. 348/6 |
| 5,565,909 A | 10/1996 | Thibadeau et al. ............ 348/9 |
| 5,568,272 A | 10/1996 | Levine ........................ 386/48 |
| 5,592,511 A | 1/1997 | Schoen et al. ............... 375/220 |
| 5,592,551 A | 1/1997 | Lett et al. .................... 380/20 |
| 5,592,626 A | 1/1997 | Papadimitriou et al. 395/200.09 |
| 5,600,839 A | 2/1997 | Macdonald ................ 395/750 |
| 5,612,741 A | 3/1997 | Loban et al. ................ 348/383 |
| 5,619,247 A | 4/1997 | Russo .......................... 348/3 |
| 5,621,863 A | 4/1997 | Boulet et al. ............... 395/124 |
| 5,627,895 A | 5/1997 | Owaki ........................ 380/54 |
| 5,628,050 A | 5/1997 | McGraw et al. ............ 455/12.1 |
| 5,630,067 A | 5/1997 | Kindell et al. .......... 395/200.09 |
| 5,638,113 A | 6/1997 | Lappington et al. ........... 348/12 |
| 5,640,453 A | 6/1997 | Schuchman et al. ........... 380/10 |
| 5,644,859 A | 7/1997 | Hsu ............................. 40/545 |
| 5,646,603 A | 7/1997 | Nagata et al. ........... 340/825.25 |
| 5,646,997 A | 7/1997 | Barton ........................ 380/23 |
| 5,654,747 A | 8/1997 | Ottesen et al. ............... 348/12 |
| 5,659,366 A | 8/1997 | Kerman ...................... 348/460 |
| 5,659,613 A | 8/1997 | Copeland et al. .............. 380/3 |
| 5,661,516 A | 8/1997 | Carles ......................... 348/8 |
| 5,664,018 A | 9/1997 | Leighton ..................... 380/54 |
| 5,675,734 A | 10/1997 | Hair ..................... 395/200.01 |
| 5,684,918 A | 11/1997 | Abecassis ................... 386/83 |
| 5,686,954 A | 11/1997 | Yoshinobu et al. ............ 348/13 |
| 5,689,799 A | 11/1997 | Dougherty et al. ............ 455/2 |
| 5,692,214 A | 11/1997 | Levine ...................... 395/833 |
| 5,701,161 A | 12/1997 | Williams et al. ............. 348/468 |
| 5,701,383 A | 12/1997 | Russo et al. ................. 386/46 |
| 5,701,397 A | 12/1997 | Steimle et al. ................ 395/27 |
| 5,710,869 A | 1/1998 | Godefray et al. ............. 395/21 |
| 5,717,814 A | 2/1998 | Abecassis ................... 386/46 |
| 5,717,832 A | 2/1998 | Steimle et al. ................ 395/24 |
| 5,721,827 A | 2/1998 | Logan et al. ........... 395/200.47 |
| 5,721,951 A | 2/1998 | Dorel ......................... 395/830 |
| 5,724,062 A | 3/1998 | Hunter ....................... 345/102 |
| 5,724,091 A | 3/1998 | Freeman et al. ............... 348/13 |
| 5,724,525 A | 3/1998 | Beyers, II et al. ............ 395/240 |
| 5,734,413 A | 3/1998 | Lappington et al. ........... 348/12 |
| 5,740,326 A | 4/1998 | Boulet et al. ................. 395/27 |
| 5,748,716 A | 5/1998 | Levine ................... 379/102.03 |
| 5,758,257 A | 5/1998 | Herz et al. ..................... 455/2 |
| 5,760,820 A | 6/1998 | Eda et al. ..................... 348/9 |
| 5,761,606 A | 6/1998 | Wolzien ..................... 455/6.2 |
| 5,781,734 A | 7/1998 | Ohno et al. ............ 395/200.47 |
| 5,790,202 A | 8/1998 | Kummer et al. ............. 348/553 |
| 5,790,937 A | 8/1998 | Gutle .......................... 455/6.3 |
| 5,799,285 A | 8/1998 | Klingman .................... 705/26 |
| 5,805,154 A | 9/1998 | Brown ........................ 345/327 |
| 5,805,763 A | 9/1998 | Lawler et al. ................ 386/83 |
| 5,809,139 A | 9/1998 | Girod et al. ................... 380/5 |
| 5,818,806 A | 10/1998 | Wong et al. .................. 369/59 |
| 5,822,432 A | 10/1998 | Moskowitz et al. ........... 380/28 |
| 5,825,407 A | 10/1998 | Cowe et al. .................... 348/6 |
| 5,826,123 A | 10/1998 | Lai ............................ 396/446 |
| RE35,954 E | 11/1998 | Levine ........................ 380/10 |
| 5,832,287 A | 11/1998 | Atalla ........................ 395/800 |
| 5,835,896 A | 11/1998 | Fisher et al. .................. 705/37 |
| 5,841,979 A | 11/1998 | Schulhof et al. ........ 395/200.67 |
| 5,845,083 A | 12/1998 | Hamadani et al. ...... 395/200.61 |
| 5,848,129 A | 12/1998 | Baker ......................... 379/67 |
| 5,848,155 A | 12/1998 | Cox ............................. 380/4 |
| 5,848,352 A | 12/1998 | Dougherty et al. ........... 455/5.1 |
| 5,854,779 A | 12/1998 | Johnson et al. ............... 369/59 |
| 5,860,068 A | 1/1999 | Cook .......................... 705/26 |
| 5,870,717 A | 2/1999 | Wiecha ....................... 705/26 |
| 5,874,985 A | 2/1999 | Matthews, III ................ 348/7 |
| 5,889,868 A | 3/1999 | Moskowitz et al. ........... 380/51 |
| 5,890,136 A | 3/1999 | Kipp ........................... 705/22 |

| | | | |
|---|---|---|---|
| 5,897,622 A | 4/1999 | Blinn et al. ............... 705/26 |
| 5,898,384 A | 4/1999 | Alt et al. ............ 340/825.36 |
| 5,899,980 A | 5/1999 | Wilf et al. ............... 705/26 |
| 5,903,878 A | 5/1999 | Talati ....................... 705/26 |
| 5,905,800 A | 5/1999 | Moskowitz et al. ........ 380/28 |
| 5,909,492 A | 6/1999 | Payne et al. ............... 380/24 |
| 5,914,920 A | 6/1999 | Yokogawa |
| 5,915,027 A | 6/1999 | Cox et al. ................. 380/54 |
| 5,915,068 A | 6/1999 | Levine ....................... 386/83 |
| 5,918,213 A | 6/1999 | Bernard et al. ............ 705/26 |
| 5,930,369 A | 7/1999 | Cox et al. ................. 380/54 |
| 5,933,798 A | 8/1999 | Linnartz ................... 702/191 |
| 5,934,795 A | 8/1999 | Rykowski et al. ......... 362/309 |
| 5,940,135 A | 8/1999 | Petrovic et al. ........... 348/473 |
| 5,940,807 A | 8/1999 | Purcell ....................... 705/26 |
| 5,943,670 A | 8/1999 | Prager ......................... 707/5 |
| 5,946,665 A | 8/1999 | Suzuki et al. ............. 705/26 |
| 5,949,885 A | 9/1999 | Leighton ................... 380/54 |
| 5,959,945 A | 9/1999 | Kleiman et al. ............. 369/30 |
| 5,960,081 A | 9/1999 | Vynne et al. ............... 380/10 |
| 5,960,411 A | 9/1999 | Hartman et al. ............ 705/26 |
| 5,963,264 A | 10/1999 | Jackson ................... 348/460 |
| 5,963,915 A | 10/1999 | Kirsch ....................... 705/26 |
| 5,963,917 A | 10/1999 | Ogram ....................... 705/26 |
| 5,966,440 A | 10/1999 | Hair ............................. 380/4 |
| 5,966,697 A | 10/1999 | Fergerson et al. .......... 705/26 |
| 5,969,283 A | 10/1999 | Looney et al. ............... 84/609 |
| 5,969,715 A | 10/1999 | Dougherty et al. ......... 345/327 |
| 5,970,471 A | 10/1999 | Hill ........................... 705/26 |
| 5,970,472 A | 10/1999 | Allsop et al. ............... 705/26 |
| 5,970,473 A | 10/1999 | Gerszberg et al. .......... 705/26 |
| 5,970,474 A | 10/1999 | Leroy et al. ................. 705/27 |
| 5,970,475 A | 10/1999 | Barnes et al. ............... 705/27 |
| 5,974,396 A | 10/1999 | Anderson et al. .......... 705/10 |
| 5,978,775 A | 11/1999 | Chen ......................... 705/26 |
| 5,983,199 A | 11/1999 | Kaneko ...................... 705/26 |
| 5,983,200 A | 11/1999 | Slotznick ................... 705/26 |
| 5,983,201 A | 11/1999 | Fay ............................ 705/27 |
| 5,988,078 A | 11/1999 | Levine ......................... 110/8 |
| 5,992,888 A | 11/1999 | North et al. ................. 283/56 |
| 6,002,772 A | 12/1999 | Saito ......................... 380/49 |
| 6,013,007 A | 1/2000 | Root et al. ................. 482/8 |
| 6,014,491 A | 1/2000 | Hair .......................... 386/31 |
| 6,025,868 A | 2/2000 | Russo ......................... 348/3 |
| 6,052,554 A | 4/2000 | Hendricks et al. ......... 455/5.1 |
| 6,067,107 A | 5/2000 | Travaille et al. .............. 348/1 |
| 6,067,532 A | 5/2000 | Gebb ......................... 705/37 |
| 6,073,372 A | 6/2000 | Davis .................... 40/124.16 |
| 6,091,693 A * | 7/2000 | Morimoto ............. 369/109.02 |
| 6,091,883 A | 7/2000 | Artigalas et al. ............ 386/83 |
| 6,115,348 A | 9/2000 | Guerra .................... 369/112 |
| 6,148,142 A | 11/2000 | Anderson ................. 386/125 |
| 6,148,428 A | 11/2000 | Welch et al. ............... 714/752 |
| 6,150,964 A | 11/2000 | McLaughlin ............... 341/59 |
| 6,233,389 B1 | 5/2001 | Barton et al. ............... 386/46 |
| 6,233,682 B1 | 5/2001 | Fritsch ....................... 713/168 |
| 6,240,401 B1 | 5/2001 | Oren et al. ................... 705/40 |
| 6,288,996 B1* | 9/2001 | Siegel ....................... 369/273 |
| 6,303,473 B1* | 10/2001 | Heffernan et al. .......... 438/483 |
| 6,341,122 B1 | 1/2002 | Usami et al. |
| 6,353,473 B1 | 3/2002 | Ishimori et al. |
| 6,413,607 B1* | 7/2002 | Kasada et al. ............. 428/64.1 |
| 6,522,618 B1* | 2/2003 | Feldman et al. ......... 369/112.01 |
| 6,582,881 B1 | 6/2003 | Chapman et al. |
| 6,743,568 B2 | 6/2004 | Hohsaka et al. |
| 6,792,021 B1 | 9/2004 | Suzuki |
| 6,850,480 B1 | 2/2005 | Naito et al. ............... 269/288 |
| 7,054,256 B2 | 5/2006 | Hunter et al. |
| 2001/0002852 A1 | 6/2001 | Kwoh ....................... 348/465 |
| 2001/0003846 A1 | 6/2001 | Rowe et al. ................. 725/47 |
| 2001/0005906 A1 | 6/2001 | Humpleman ............... 725/82 |
| 2001/0010045 A1 | 7/2001 | Stefik et al. ................. 705/51 |
| 2001/0010095 A1 | 7/2001 | Ellis et al. ................... 725/44 |
| 2001/0013037 A1 | 8/2001 | Matsumoto ................. 707/5 |
| 2001/0013120 A1 | 8/2001 | Tsukamoto ................. 725/5 |
| 2001/0014882 A1 | 8/2001 | Stefik et al. ................. 705/51 |
| 2001/0016836 A1 | 8/2001 | Boccon-Gibod et al. ...... 705/51 |
| 2001/0017920 A1 | 8/2001 | Son et al. .................... 380/212 |
| 2001/0018742 A1 | 8/2001 | Hirai ........................... 713/193 |
| 2001/0018858 A1 | 9/2001 | Dwek .......................... 84/609 |
| 2001/0023416 A1 | 9/2001 | Hosokawa .................. 705/51 |
| 2001/0023417 A1 | 9/2001 | Stefik et al. ................. 705/57 |
| 2001/0023428 A1 | 9/2001 | Miyazaki .................. 709/201 |
| 2001/0024425 A1 | 9/2001 | Tsunoda et al. ............. 370/82 |
| 2001/0024566 A1 | 9/2001 | Mankovitz .................. 386/83 |
| 2001/0025259 A1 | 9/2001 | Rouchon .................... 705/26 |
| 2001/0025269 A1 | 9/2001 | Otsuka ....................... 705/52 |
| 2001/0025316 A1 | 9/2001 | Oh .............................. 709/231 |
| 2001/0027561 A1 | 10/2001 | White et al. ................. 725/1 |
| 2001/0027563 A1 | 10/2001 | White et al. ................. 725/46 |
| 2001/0029491 A1 | 10/2001 | Yoneta et al. ............... 705/53 |
| 2001/0029538 A1 | 10/2001 | Blockton et al. ............ 709/226 |
| 2001/0029583 A1 | 10/2001 | Palatov et al. ............... 713/193 |
| 2001/0030660 A1 | 10/2001 | Zainoulline ................. 345/720 |
| 2001/0031066 A1 | 10/2001 | Meyer et al. ................. 382/100 |
| 2001/0032131 A1 | 10/2001 | Mowry ....................... 705/14 |
| 2001/0032132 A1 | 10/2001 | Moran ....................... 705/14 |
| 2001/0032133 A1 | 10/2001 | Moran ....................... 705/14 |
| 2001/0032187 A1 | 10/2001 | Nuttall ....................... 705/57 |
| 2001/0032312 A1 | 10/2001 | Runje et al. ................. 713/172 |
| 2001/0034635 A1 | 10/2001 | Winters ..................... 705/10 |
| 2001/0034714 A1 | 10/2001 | Terao et al. ................. 705/57 |
| 2001/0034883 A1 | 10/2001 | Zigmond .................... 725/109 |
| 2001/0056144 A1 | 12/2001 | Lamb et al. |
| 2006/0164958 A1 | 7/2006 | Hunter et al. |

FOREIGN PATENT DOCUMENTS

| | | |
|---|---|---|
| EP | 0 954 176 A2 | 11/1999 |
| EP | 0 954 179 A2 | 11/1999 |
| EP | 0 975 111 A2 | 1/2000 |
| EP | 0 977 389 A2 | 2/2000 |
| EP | 0 984 631 A1 | 3/2000 |
| EP | 0 994 470 A2 | 4/2000 |
| EP | 1 104 195 A2 | 5/2001 |
| EP | 1 143 721 A1 | 10/2001 |
| WO | WO 91/03112 | 3/1991 |
| WO | WO 96/26605 | 8/1996 |
| WO | WO 96/34467 | 10/1996 |
| WO | WO 96/34494 | 10/1996 |
| WO | WO 99/18727 | 4/1999 |
| WO | WO 00/07368 | 2/2000 |
| WO | WO 01/41013 | 6/2001 |
| WO | WO 01/47249 | 6/2001 |

OTHER PUBLICATIONS

Adams, R., "Universal Product Code (UPC) and EAN Article Numbering Code (EAN) Page," http://www.adams1.com/pub/russadam/upccode.html, downloaded Sep. 24, 2001.

Ashton Digital VisionGate 52 15.1' TFT-LCD, Pivot Screen, USB Hub, w/Speakers, wysiwyg://253/http://auctions.egghead.com...LotNo+66044439, downloaded Sep. 26, 2001.

Bannan, K., "Streaming Onto the Movie Screen, with Nary a Scratch," *The New York Times*, May 9, 2002, p. E5.

"Bid Receipt for Bid No. 5270411," wysiwyg:/220http://auctions.egghead.com...KioskListing=0, downloaded Sep. 29, 2001.

"Calimetrics' Multilevel Technology Enables Higher-Performance CD/DVD Recorders: An IDC White Paper," *Wolfgang Schlichting*, 2000.

"Confirm Your Bid," wysiwyg:/220http://auctions.egghead.com...ShipCountry=US, downloaded Sep. 29, 2001.

"DataPlay, Inc.—Universal Recording Media—Discover," http://www/dataplay.com/jsp_files/en/discover/index-music.jsp, 2001, downloaded on May 14, 2002.

"DataPlay, Inc.—Universal Recording Media—Industry," http://www.dataplay.com/jsp_files/en/industry.contentproviders.jsp, 2001, downloaded on May 14, 2002.

"DataPlay, Inc.—Universal Recording Media—Industry," http://www.dataplay.com/jsp_files/en/industry/index.jsp, 2001, downloaded on May 14, 2002.

"DataPlay, Inc.—Universal Recording Media—Industry," http://www.dataplay.com/jsp_files/en/industry/products-contentkey.jsp, 2001, downloaded May 14, 2002.

"DataPlay, Inc.—Universal Recording Medai—Industry," http://www.dataplay.com/jsp_files/en/industry/products-digitalmedia.jsp, 2001, downloaded May 14, 2002.

DataPlay, Inc.—Universal Recording Media—Industry, http://www.dataplay.com/jsp_files/en/industry/products-engines.jsp, 2001, downloaded May 14, 2002.

"DataPlay, Inc.—Universal Recording Media—What's Playing on DataPlay," http://www/dataplay.com/jsp_files/en/whatsplaying/products.jsp, 2001, downloaded May 14, 2002.

"DataPlay, Inc.—Universal Recording Media—What's Playing on DataPlay," http://www.dataplay.com/jsp_files/en/whatsplaying/products.jsp?action=details, 2001, downloaded May 14, 2002.

"DataPlay, Inc.—Universal Recording Media—What's Playing on DataPlay," http://www/dataplay.com/servlets/ProductList?action=productSearch, 2001, downloaded May 14, 2002.

"Demographics profile," http://www.egghead.com/ShowPage.dll?page=hd_aboutus_demo_p, downloaded Sep. 29, 2001.

Egghead Packing Receipt (Franklin Rex Organizer), received Dec. 1999.

"Enter Your Bid," https://auctions.egghead.com/scripts/...LotNo=66044439, downloaded Sep. 29, 2001.

"Enter Your Bid," wysiwyg://218/http://auctions.egghead.com...5a99, downloaded Sep. 29, 2001.

"How Wink Works," http://www.wink.com/contents /howitworks.shtml, downloaded May 14, 2002.

"ICAP and HTML (ATVEF)," http://www.wink.com/contents/tech_icap.shtml, downloaded on May 14, 2002.

"Internet Archive Way Back Machine," Searched for http://www.egghead.com, 2001, downloaded Apr. 8, 2002.

"Internet Archive Way Back Machine," Searched for http://www.onsale.com, 2001, downloaded Apr. 8, 2002.

"Login/Logout," http://www.egghead.com/ShowPage.dll?page...44439, downloaded Sep. 29, 2001.

Morley, S., "Making Digital Cinema Actually Happen—What it Takes and Who's Going to Do it," 1998.

"New Credit Information," https://secure.fairmarket.com/secure/Cre...FM1001, downloaded Sep. 26, 2001.

"Onsale Invoice," http.//www.onsale.com/cgi-win/invoice.exe, dated Jan. 19, 1998, copyright 1997, downloaded Jan. 20, 1998.

Onsale Packing Sheet (Jason Deep Space Series 225 X 60 Astronomy Telescope), received Jul. 1999.

"Privacy and Security Policy," http://www.egghead.com/ShowPage.dll?page=hd_policy_policyandprivacy_p, downloaded Sep. 29, 2001.

"Quadrant 256MB, PC133 (PC-100 Compatible), 32X64, 7ns, 168-Pin, SdRAM DIMM Module (New)," wysiwyg://253/http://auctions.egghead.com...LotNo=65659811&BatchNo=0, downloaded Sep. 24, 2001.

"Registration," http://www.egghead.com/ShowPage.dll?page=reg_page1_ceos&S=1, downloaded Sep. 26, 2001.

"Sell Goods to Egghead.com," http://www.egghead.com/ShowPage.dll?page=hd_aboutus_sellgoods_p, downloaded Sep. 29, 2001.

"The Wink System," http://www.wink.com/contents/tech_diagram.shtml, downloaded on May 14, 2002.

"What's Playing on DataPlay—Everything Digital," DataPlay Digital Mediat Product Brochure, 2000-2001, downloaded May 14, 2002.

"What's Playing on DataPlay—Everything Digital," DataPlay Micro-optical Engine Product Brochure, 2000-2002, downloaded May 14, 2002.

"Wink Announces First National Advertising Partners: AT&T, Levi Strauss & Co., and GE," http://www.wink.com/contents/PressReleases/930708938/content.shtml, Sep. 9, 1998, downloaded May 14, 2002.

"Wink Broadcast Server," http://www.wink.com/contents/tech_wbs.shtml, downloaded on May 14, 2002.

"Wink Client Software," http://www.wink.com/contents/tech_engine.shtml, downloaded May 14, 2002.

"Wink Communications, Inc., Changes the Advertising Landscape," http://www.wink.com/contents/PressReleases/930709807/content.shtml, Jan. 21, 1999, downloaded May 14, 2002.

"Wink's History," http://www.wink.com/contents/history.shtml, downloaded on May 14, 2002.

"What is Wink: Examples," http://www.wink.com/contents/examples.shtml, downloaded on May 14, 2002.

"Wink Response Server and Wink Response Network," http://www.wink.com/contents/tech_wrs.shtml, downloaded May 14, 2002.

"Wink Studio and Wink Server Studio," http://www.wink.com/contents/tech_studio.shtml, downloaded May 14, 2002.

"Wink Television Press Room," http://www.wink.com/contents/PressReleases.shtml, downloaded on May 14, 2002.

US 5,825,354, 10/1998, Ahmad et al. (withdrawn)

* cited by examiner

HIGH CAPACITY DIGITAL DATA STORAGE BY TRANSMISSION OF RADIANT ENERGY THROUGH ARRAYS OF SMALL DIAMETER HOLES

CROSS REFERENCE TO RELATED APPLICATIONS

This application is a continuation application of U.S. patent application Ser. No. 10/082,928 filed Oct. 19, 2001, which claims benefit to U.S. Provisional Application No. 60/242,042 filed on Oct. 20, 2000 which are hereby incorporated by reference in their entirety.

This application is also related to U.S. patent application Ser. No. 11/370,756, filed Mar. 08, 2006.

TECHNOLOGICAL FIELD

The present invention relates generally to digital data storage, and more particularly, to high capacity digital data storage.

BACKGROUND

Compact Discs (CD's) and Digital Versatile Disks (DVD's) have been developed to increase the amount of data that can be stored on a storage medium. These types of storage media have data on them in the form of pits and lands that are written and read with lasers along a track. Generally, the track is helical in shape and each pass of the track is separated from adjacent passes of the track by a track pitch. A standard single sided CD can store approximately 800 Megabytes of data, while a double-sided CD can store 1600 Megabytes of data. A DVD, has a track pitch of about 0.74 microns and a single side/single layer DVD can store about 4.4 Gigabytes of data, which is roughly equivalent to about 2 hours of movie playing time.

Therefore, some movies and other types of digital content cannot fit on a CD and can very easily be too large to even fit on a DVD. Furthermore, with the advent of certain technologies and business plans for the distribution of "content", it may be advantageous to store a library of digital content, such as movies, on a single removable storage medium. Current CD's and DVD's cannot be used for such purposes.

SUMMARY

Therefore it is an object of the present invention to provide a data storage medium having a higher storage density than the storage mediums of the prior art.

Accordingly, a storage media for storage of data thereon is provided. The storage media comprises: a first layer, the first layer being substantially transparent to a predetermined radiant energy used for reading the data; and a second layer formed on the first layer and being substantially opaque to the radiant energy, the second layer having a pattern comprising a plurality of holes, each of the holes (or at least one of the holes) having a largest dimension which is greater than a wavelength of the radiant energy, the data being stored as the presence or absence of a hole in the pattern.

Preferably, the first layer is polycarbonate and the second layer is a metalization coating. The metalization coating is preferably aluminum.

Preferably, the plurality of holes are circular and the largest dimension is a diameter of the circular holes. The diameter of the holes is preferably in the range of about 30 to 100 nanometers with a distance between successive holes preferably being in a range of about 30 to 100 nanometers.

The pattern preferably comprises the plurality of holes arranged along a helix beginning near a center of the storage media and extending spirally outward, each successive pass of the helix being separated from a previous pass of the helix by a track pitch. The track pitch is preferably about 100 nanometers.

Preferably, the plurality of holes are circular and the largest dimension is a diameter of the circular holes, the diameter of the holes being about 50 nanometers, a distance between successive holes being about 100 nanometers, and the track pitch being about 100 nanometers. Alternatively, the diameter of the holes being about 30 nanometers, a distance between successive holes is about 60 nanometers, and the track pitch being about 100 nanometers.

Preferably, the storage media further comprises a third layer, the third layer being disposed on the second layer and being substantially transparent to the radiant energy. The third layer is preferably acrylic.

The storage media is preferably circular in shape and has a data storage area having an inner diameter of about 25 millimeters and an outer diameter of about 115 millimeters.

Further provided is an apparatus for reading the storage media. The apparatus comprises: a radiant energy source having an output of radiant energy directed towards the plurality of data holes; and a plurality of detectors for detecting the radiant energy diffusing from the plurality of data holes.

The radiant energy source is preferably a blue laser diode or an ultraviolet laser diode. The radiant light source preferably has a wavelength in the range of about 50 nanometers to 450 nanometers and most preferably a wavelength of about 410 nanometers.

The detectors are preferably photodetectors. The photodetectors are preferably formed of a wide bandgap material, such as silicon carbide, gallium arsenide, gallium nitride, aluminum nitride, zinc selenide, gallium nitride/aluminum nitride alloy, aluminum nitride/silicon carbide alloy and aluminum gallium nitride/gallium nitride.

The apparatus preferably further comprises a mask positioned between the storage media and the detectors for reducing interference from the radiant energy diffusing through unintended data holes. The mask preferably comprises a material having a pattern of mask holes arranged to restrict the number of data holes observed by a single detector. Preferably, the mask holes are rectangular in shape and have a smaller side dimension approximately equal to the largest dimension of the data holes.

Preferably, the radiant energy source is positioned on the side of the storage media having the first layer and is directed towards the detectors that are positioned on the side of the storage media opposite the first layer.

Still yet provided is a method for reading the storage media. The method comprises: directing radiant energy from a radiant energy source towards the plurality of data holes; and detecting the radiant energy diffusing from the data holes with a plurality of detectors.

BRIEF DESCRIPTION OF THE DRAWINGS

These and other features, aspects, and advantages of the apparatus and methods of the present invention will become better understood with regard to the following description, appended claims, and accompanying drawings where:

DETAILED DESCRIPTION OF ILLUSTRATIVE EMBODIMENTS

In summary, the present invention is a storage media, and a device and method for storing and reading large amounts of digital data using an array of holes that transmit radiant energy whose wavelength is less than the diameter of the holes. Data is stored on low-cost media by melting or ablating material to form the holes using a light, such as ultraviolet, x-ray or electron beams, with a wavelength shorter than the light used to read back the data. To read the data, intense light is shined on one side of the media as an array of sensitive light detectors on the other side of the media which record and differentiate among the small amounts of light received.

Figure 1:
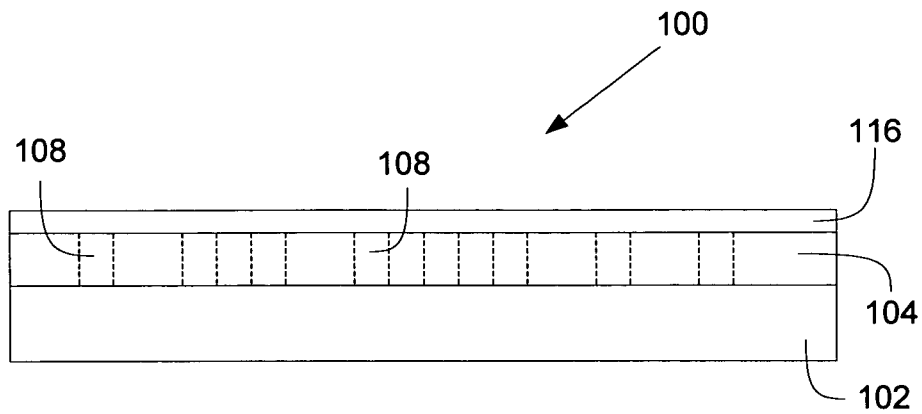
FIG. 1 illustrates a side view of a representative high capacity digital storage medium in the form of a polycarbonate disk with an opaque layer containing the data holes and a protective coating.
Figure 2A:
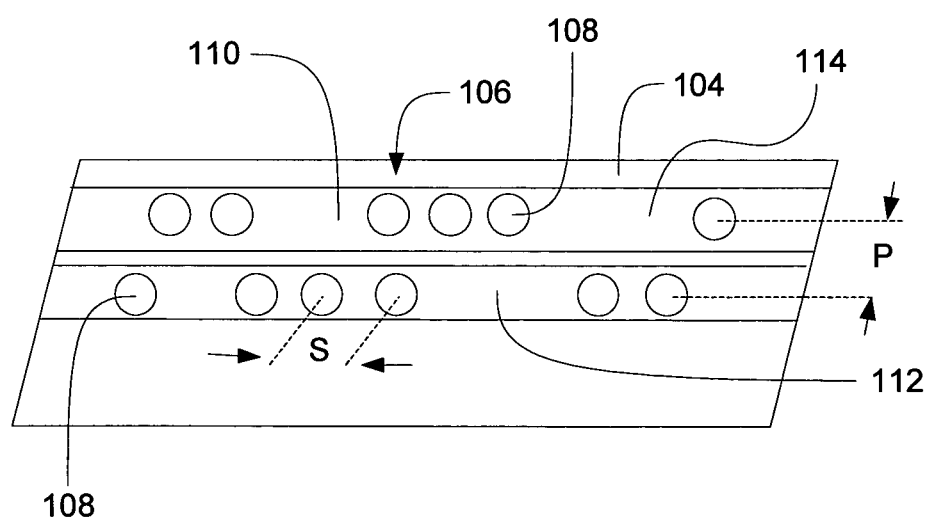
FIG. 2A illustrates a spiral embodiment of the presently disclosed subject matter.
Figure 2B:
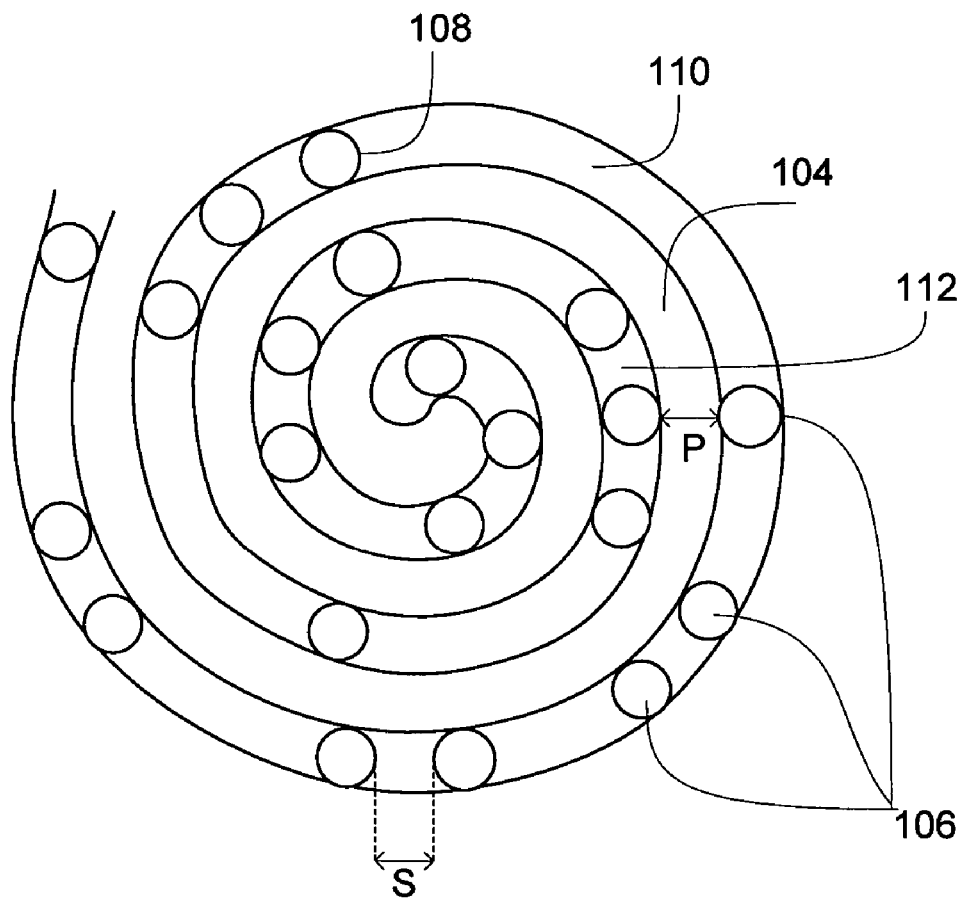
FIG. 2B illustrates an enlarged top view of a small portion of the disk of FIG. 1 showing two adjacent track segments.

Referring now to FIGS. 1, 2A, and 2B (not to scale), there is shown a preferred implementation of the storage media of the present invention, generally referred to by reference numeral 100. The storage media 100 is preferably a thin, transparent plastic disk approximately 120 millimeters in diameter, about the size of a conventional CD. Thus, storage media 100 is preferably circular in shape and has a data storage area having an inner diameter of about 25 millimeters and an outer diameter of about 115 millimeters.

The storage media comprises a first layer 102. The first layer 102 is substantially transparent to a predetermined radiant energy used for reading the data stored on the storage media 100. Since, as will be discussed below, the preferred radiant energy source is a light source having a wavelength between 50 and 450 nanometers, the first layer is preferably fabricated from a rigid polycarbonate layer, which is substantially transparent to such wavelength light. The polycarbonate first layer 102 can be fabricated by any methods known in the art, such as by casting.

The storage media 100 also includes a second layer 104 formed on the first layer 102. The second layer 104 is substantially opaque to the radiant energy used to read the data stored on the storage media 100. Using the preferred light source discussed above, the second layer 104 is preferably metallic, such as aluminum. The metallic second layer 104 is preferably formed on the first layer 102 by a metalization process such as sputtering. Such processes are well known in the art. The second layer preferably has a thickness that is thick enough to be opaque to the radiant energy used to read the data from the storage media. Depending on the type of material, this thickness can be on the order of 50 to 250 nanometers, however, it may be more or less without departing from the scope or spirit of the present invention.

The second layer 104 has a pattern 106 comprising a plurality of holes 108 (alternatively referred to as "data holes"). Each of the holes 108 have a largest dimension which is greater than a wavelength of the radiant energy used to read the data. The data is stored on the storage media 100 as the presence or absence of a hole 108 in the pattern 106. The plurality of holes 108 are preferably circular where the largest dimension is a diameter of the circular holes 108. Those skilled in the art will appreciate that other shape holes 108 are possible without departing from the scope or spirit of the invention. Furthermore, those skilled in the art will appreciate that the formation of very small diameter circular holes results in holes that are substantially circular but which may deviate somewhat from a circular shape. The use of the term "circular" is meant to include such deviations.

The circular holes 108 preferably have a diameter in a range of about 30 to 100 nanometers (nm), more preferably of about 50 nanometers. The distance (S) between successive holes is preferably a hole diameter apart, or in a range of about 30 to 100 nanometers. Similar to the pattern of pits and lands on a conventional CD and DVD, the pattern 106 of holes 108 are preferably arranged along a helix track 110 beginning near a center of the storage media 100 and extending spirally outward. Each successive pass of the helix track is separated from a previous pass of the helix by a track pitch (P). FIGS. 2A and 2B illustrates two successive passes 110, 112 of the helix track 110. FIG. 2A approximates the passes 110, 112 as being linear for clarification purposes, while FIG. 2B shows a portion of the actual helical implementation. In the case where the diameter of the holes 108 is 50 nanometers, the track pitch is preferably 100 nanometers or twice the diameter of the holes 108. The pattern 106 of holes 108 is formed in the second layer 104 by methods known in the art such as by conventional x-ray lithography as is known in the fabrication of integrated circuits. As discussed above, data is stored on the storage media 100 as the presence or absence of a hole 108 in the overall pattern 106.

The storage media 100 preferably further has a third layer 116 formed on the second layer 104, which acts as a protective coating for the pattern 106 of holes 108. The third layer 116, like the first layer 102, is substantially transparent to the radiant energy used to read the data from the storage media 100. The third layer 116 is preferably acrylic and is deposited on the second layer 104 by methods known in the art, such as by spraying or chemical vapor deposition depending on the type of material and thickness desired.

The storage media 100 of the present invention preferably has a size similar to a standard CD, namely having a 120 millimeter diameter disk and having 50 nm diameter holes spaced 100 nm center to center (S) as a helix with a track pitch (P) of 100 nm. This helix has a minimum diameter of 25 mm and an outer diameter of 115 mm. Thus, the total length of the helix is about 99,000 meters, and may contain up to 1E12 (1,000,000,000,000) holes or store up to 125 gigabytes of data. Similarly, using holes that are 30 nm in diameter, with a spacing (S) of 60 nm permits storage of up to 350 gigabytes of data. In the case of a 350 gigabyte capacity disk, the actual capacity may be significantly less when the data is encoded with error correcting codes and alignment rings or holes which are included to facilitate tracking a helical track of holes.

Figure 3:
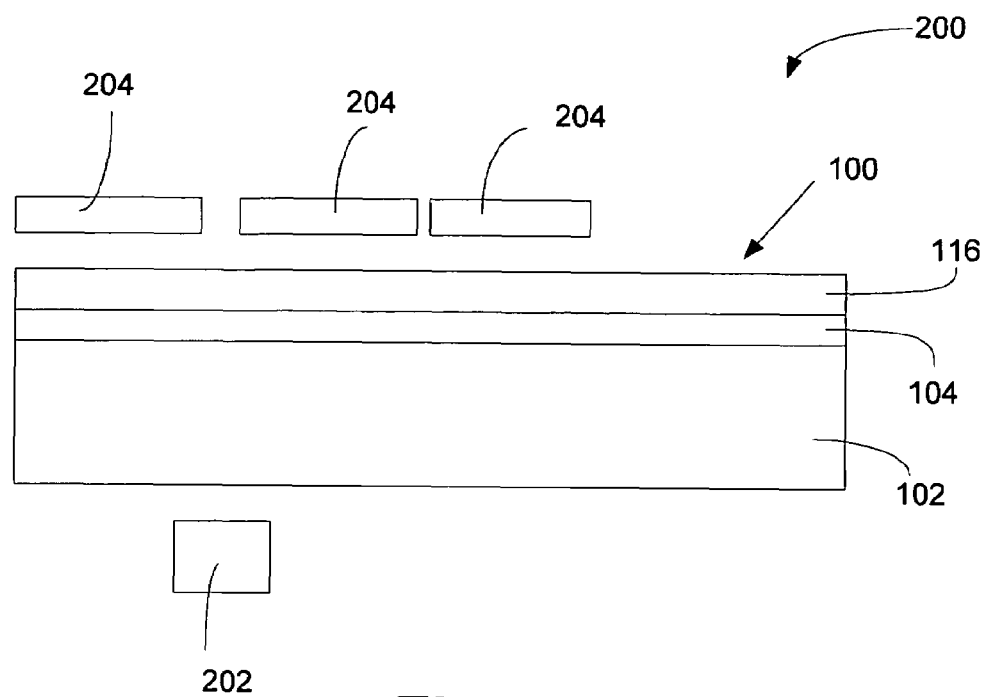
FIG. 3 illustrates a side view of a portion of a disk such as the one shown in FIG. 1 with an array of photodetectors on one side of the disk and a light source on the other side of the disk.
Figure 4:
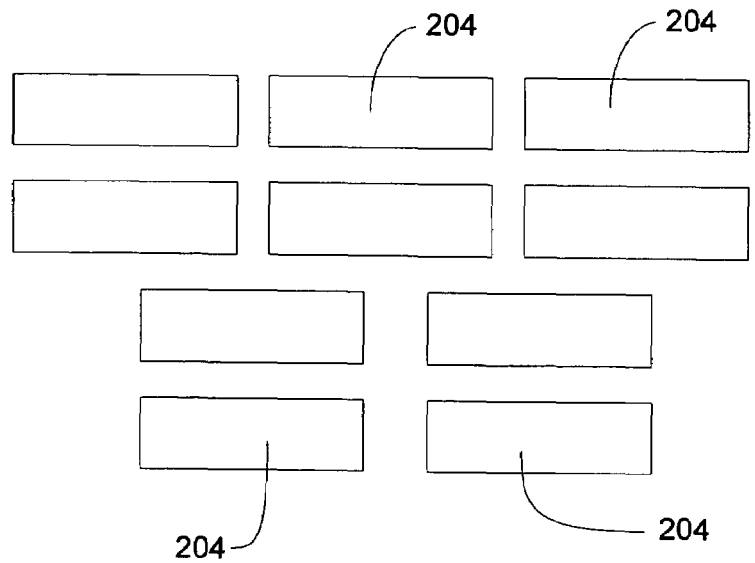
FIG. 4 illustrates a top view of the arrangement shown in FIG. 3.
Figure 5:
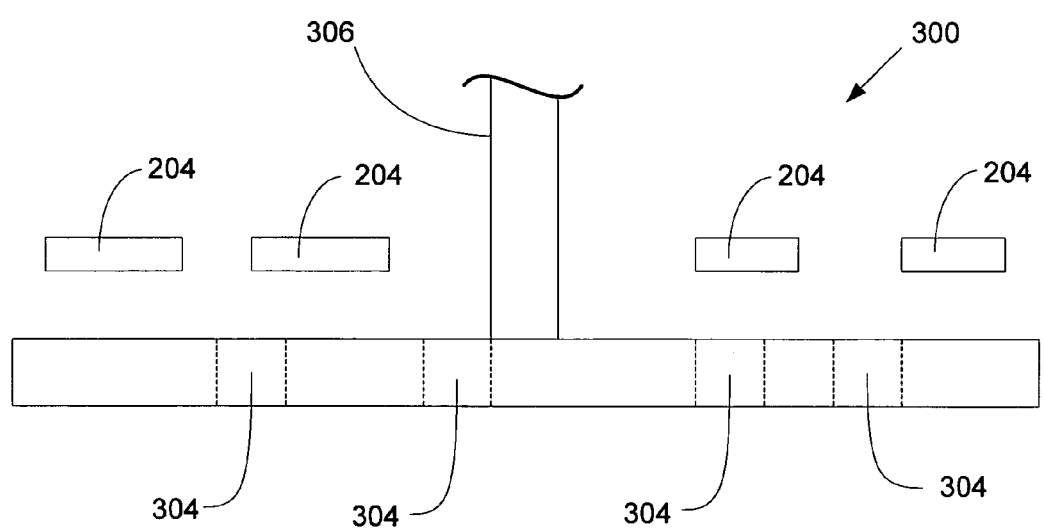
FIG. 5 illustrates a view of portions of one form of a masking arrangement.

Referring now to FIGS. 3-5, there is illustrated a schematic representation of an apparatus for reading the data stored on the storage media 100 of the present invention, generally referred to by reference numeral 200. Conventional components of such a device are well known in the art and are therefore not discussed for the sake of brevity. Such components include, but are not limited to means for retaining the storage media, such as a platter; means for spinning the platter, such as a servo motor; and circuit means for tracking the holes 108, processing the stored data, and producing a useful result, such as to output the data to a video monitor in a desired format.

FIG. 3 illustrates the apparatus 200 and a side view of the storage media 100 of FIG. 1 oriented therein. The apparatus 200 includes a radiant energy source 202 having an output of radiant energy directed towards the plurality of data holes 108. Radiant energy source 202 is preferably a light source such as a blue or uv laser diode, such as those manufactured by Cree, Inc. of Durham, N.C., USA. source 202 preferably operates at 3 mW and produces an intense blue light at about 410 nm. However, it will be appreciated that the light source is preferably in the deep UV to blue range of about 50 nm to 450 nm in wavelength. It should also be appreciated that while radiant energy having wavelengths in this range are preferred, radiant energy below (e.g., x-rays) and above this band may also be used.

The light source 202 preferably takes the form of a solid-state light emitting diode or laser diode, formed from a wide bandgap material such as silicon carbide. Other wide bandgap materials include gallium arsenide, gallium nitride, aluminum nitride, zinc selenide, gallium nitride/aluminum nitride alloy, aluminum nitride/silicon carbide alloy and aluminum gallium nitride/gallium nitride heterojunctions, which, as known in the art, will produce light at a wavelength that is determined primarily by the bandgap of the semiconductor material. However, silicon carbide detectors are favored because they have the advantages of sensitivity that peaks in the range of deep blue and ultraviolet, extremely low dark current so that extremely small light levels can be detected, and relatively low fabrication costs.

Apparatus 200 also includes an array of detectors 204 arranged on an opposite side of the disk from the radiant energy source 202. The plurality of detectors 204 are preferably photodetectors and detect the radiant energy from the radiant energy source 202 diffusing from the plurality of data holes. The radiant energy source 202 is preferably positioned on the side of the storage media 100 having the first layer 102 and is directed towards the detectors 204 that are positioned on the side of the storage media 100 opposite the first layer 102 (e.g., proximate to the second and third layers 104, 116).

When used with a radiant energy source 202 in the form of a light source 202, the discrete photodetectors 204 of the photodetector array are sensitive to light at the wavelength of the light source 202. In a preferred implementation, photodetectors 204 take the form of model no. CD-260-1-00-D silicon carbide ultraviolet photodetector chips manufactured by Cree, Inc. of Durham, N.C., USA. These photodetectors have extraordinary responsibility to light in a band including the wavelength of the light source 202 and have exceptionally low dark current. Further details for the manner in which photodetectors 204 are preferably arranged is shown in the top view of FIG. 4.

Likewise, photodetectors used in accordance with the invention are preferably solid-state devices such as the mentioned Cree, Inc. silicon carbide photodetectors, where the responsivity curve of the photodetector matches the wavelength of the light output by the light source 202. Solid state photodetectors may be formed to match the light source from various wide bandgap semiconductor materials, including silicon carbide and the others mentioned above.

To read the data stored on the storage media 100, the storage media 100, in the form of a disk, is slowly spun while the source of radiant energy 202, for example, the blue or UV laser diode, is preferably focused into about a 1 micrometer diameter area on one side of the storage media disk 100 while the array of photodetectors 204 on the other side of the storage media disk 100 sense light passing through and diffusing from the holes 108 formed on the storage media 100.

The detectors 204 may be arrayed in a brick-like pattern as illustrated in FIG. 4. The brick array of detectors 204 may have redundant detector elements so that not all detector elements need to be operational. Thus, even flawed detector arrays are usable so that fabrication costs will be lessened by excellent yields.

Referring now to FIG. 5, a masking means is illustrated, generally referred to by reference numeral 300. The masking means 300 masks the detectors 204 to restrict the number of holes 108 observed by a single detector 204. The masking means 300 is carried by a servo mechanism of the tracking system (not shown) used to track the holes 108. Masking means 300 includes a mask body 302 with masking openings 304 preferably having a diameter corresponding to the diameter of holes 108 in the second layer 104, for example, 50 run. Mask body 62 is attached to the servo mechanism by a mounting member 306. In a preferred implementation of the apparatus 200 for reading the data stored on the storage media 100, individual detectors 204 are masked with masking openings in the form of rectangles such that the sides of the rectangles approximate the diameters of the holes 108 in the media. The mask body 302 is preferably sufficiently thick so that the masking openings 304 act both as apertures and tunnels in reducing interference from light flowing through nearby data holes 108. The mask body 302 on the detector array is preferably also held very close to the surface of the storage media 100 to minimize crosstalk between neighboring holes. In an alternate implementation, a lens (not shown) positioned between the array of detectors 204 and the mask body 302 avoids the need to closely position the array against the mask body while still limiting crosstalk of light between adjacent holes.

The use of strong blue, deep blue and ultraviolet laser diodes and corresponding high-sensitivity photoelectric sensors makes possible this new type of optical storage medium based upon the weak transmission of light through extremely tiny holes (or blocked by extremely tiny objects). By nature of the substrates used to produce photoelectric sensors, sensors for very short wavelengths have extraordinarily small dark currents so that with proper amplification, extremely small quantities of light can be measured without requiring cooling. Furthermore, because sensors can be fabricated by an inexpensive process, arrays of these sensors can be made reliably for a very low per-pixel cost. Furthermore, by fabrication of arrays of these sensors on a single substrate, perhaps several millimeters square, following the path of the holes on the storage media can be accomplished by completely electronic means (except for a relatively imprecise mechanical motor and gearing to slowly step the small array across the radius of the storage media).

It is also possible to use the array of sensors to read multiple tracks of the helix simultaneously, allowing a slower rotation of the storage media or higher data rates than are currently possible with conventional media such as a CD. For example, simultaneous reading of ten tracks would allow the storage media to move at a speed of 30 mm/sec by turning at a rate of about 5 to 30 rpm.

Those skilled in the art will appreciate that the high capacity digital data storage media of the present invention allows low cost distribution of data. For example a 125 gigabyte disk may store about 100 movies that can be decompressed and played with VHS quality, or it may store the music from the 1000 CD's, again using typical audio compression techniques such as MPEG-3 or AAC. Use of higher compression techniques would permit the storage of even more movies and/or CD's on such a disk. This low-cost storage media presents an opportunity for new and advantageous business models for the mass distribution of movies and/or music to consumers. While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed:

1. A storage media for storage of data thereon, the storage media comprising:
    a first layer being substantially transparent to a radiant energy of predetermined optical wavelength used for reading the data;
    a second layer formed on the first layer and being substantially opaque to the radiant energy, the second layer having a pattern comprising a plurality of holes, at least one of the holes having a largest dimension which is greater than the predetermined optical wavelength of the radiant energy, the data being stored as the presence or absence of a hole in the pattern; and
    a third layer being disposed on the second layer and being substantially transparent to the radiant energy;
    wherein the first, second, and third layers are configured such that said radiant energy passes through said storage media at substantially the same predetermined optical wavelength.

2. The storage media of claim 1, wherein the first layer comprises polycarbonate.

3. The storage media of claim 1, wherein the second layer comprises a metalization coating.

4. The storage media of claim 3, wherein the metalization coating comprises aluminum.

5. The storage media of claim 1, wherein the plurality of holes are circular and the largest dimension is a diameter of the circular holes.

6. The storage media of claim 1, wherein the pattern comprises the plurality of holes arranged along a helix beginning near a center of the storage media and extending spirally outward, each successive pass of the helix being separated from a previous pass of the helix by a track pitch.

7. The storage media of claim 6, wherein the plurality of holes are circular and the largest dimension is a diameter of the circular holes, the diameter of the holes being in a range of about 30 to 100 nanometers.

8. A storage media for storage of data thereon, the storage media comprising:
    a first layer being substantially transparent to a radiant energy of predetermined optical wavelength used for reading the data;
    a second layer formed on the first layer and being substantially opaque to the radiant energy, the second layer having a pattern comprising a plurality of holes, at least one of the holes having a largest dimension which is greater than the predetermined optical wavelength of the radiant energy, the data being stored as the presence or absence of a hole in the pattern; and
    a third layer being disposed on the second layer and being substantially transparent to the radiant energy;
    wherein the pattern comprises the plurality of holes arranged along a helix beginning near a center of the storage media and extending spirally outward, each successive pass of the helix being separated from a previous pass of the helix by a track pitch;
    wherein a distance between successive holes is in a range of about 30 to 100 nanometers.

9. The storage media of claim 1, wherein the third layer comprises acrylic.

10. The storage media of claim 1, wherein the storage media is circular in shape and has a data storage area having an inner diameter of about 25 millimeters and an outer diameter of about 115 millimeters.

11. An apparatus for reading a storage media, the storage media comprising a first layer being substantially transparent to a radiant energy of a predetermined optical wavelength used for reading the data; and a second layer formed on the first layer and being substantially opaque to the radiant energy, the second layer having a pattern comprising a plurality of data holes, at least one of the data holes having a largest dimension which is greater than the predetermined optical wavelength of the radiant energy, the data being stored as the presence or absence of a data hole in the pattern; and a third layer that is disposed on the second layer and is substantially transparent to the radiant energy; wherein the first, second, and third layers are configured such that said radiant energy passes through said storage media at substantially the same predetermined optical wavelength, the apparatus comprising:
    a radiant energy source having an output of radiant energy capable of being directed towards said storage media; and
    a plurality of detectors configured to detect the radiant energy diffusing from the plurality of data holes of said storage media.

12. The apparatus of claim 11, wherein the radiant energy source comprises a blue laser diode.

13. The apparatus of claim 11, wherein the radiant energy source comprises an ultraviolet laser diode.

14. The apparatus of claim 11, wherein the radiant energy source has a wavelength in the range of about 50 nanometers to 450 nanometers.

15. The apparatus of claim 11, wherein the radiant energy source has a wavelength of about 410 nanometers.

16. The apparatus of claim 11, wherein the detectors comprise photodetectors.

17. The apparatus of claim 16, wherein the photodetectors comprise a wide bandgap material.

18. The apparatus of claim 17, wherein the wide bandgap material is selected from a group consisting of silicon carbide, gallium arsenide, gallium nitride, aluminum nitride, zinc selenide, gallium nitride/aluminum nitride alloy, aluminum nitride/silicon carbide alloy and aluminum gallium nitride/gallium nitride.

19. The apparatus of claim 11, further comprising a mask positioned between the storage media and the detectors for reducing interference from the radiant energy diffusing through unintended data holes.

20. The apparatus of claim 19, wherein the mask comprises a material having a pattern of mask holes arranged to restrict the number of data holes observed by a single detector.

21. The apparatus of claim 20, wherein the mask holes are rectangular in shape and have a smaller side dimension approximately equal to the largest dimension of the data holes.

22. The apparatus of claim 11, wherein the radiant energy source is positioned on the side of the storage media having the first layer and is directed towards the detectors that are positioned on the side of the storage media opposite the first layer.

23. A method for reading a storage media, the storage media comprising a first layer being substantially transparent to a radiant energy of a predetermined optical wavelength used for reading the data; and a second layer formed on the first layer and being substantially opaque to the radiant energy, the second layer having a pattern comprising a plurality of data holes, at least one of the data holes having a largest dimension which is greater than the predetermined optical wavelength of the radiant energy, the data being stored as the presence or absence of a data hole in the pattern; and a third layer that is disposed on the second layer wherein the third layer is substantially transparent to the radiant energy; wherein the first, second, and third layers are configured such that said radiant energy passes through said storage media at substantially the same predetermined optical wavelength, the method comprising:

directing radiant energy from a radiant energy source towards said storage media; and detecting the radiant energy diffusing from the data holes of said storage media with a plurality of detectors.

24. The method of claim 23, wherein the radiant energy source comprises a blue laser diode.

25. The method of claim 23, wherein the radiant energy source comprises a ultraviolet laser diode.

26. The method of claim 23, wherein the radiant energy source has a wavelength in the range of about 50 nanometers to 450 nanometers.

27. The method of claim 23, wherein the radiant energy source has a wavelength of about 410 nanometers.

28. The method of claim 23, wherein the detectors comprise photodetectors.

29. The method of claim 28, wherein the photodetectors comprise a wide bandgap material.

30. The method of claim 29, wherein the wide bandgap material is selected form a group consisting of silicon carbide, gallium arsenide, gallium nitride, aluminum nitride, zinc selenide, gallium nitride/aluminum nitride alloy, aluminum nitride/silicon carbide alloy and aluminum gallium nitride/gallium nitride.

31. The method of claim 23, further comprising a mask positioned between the storage media and the detectors for reducing interference from the radiant energy diffusing through unintended data holes.

32. The method of claim 31, wherein the mask comprises a material having a pattern of mask holes arranged to restrict the number of data holes observed by a single detector.

33. The method of claim 32, wherein the mask holes are rectangular in shape and have a smaller side dimension approximately equal to the largest dimension of the data holes.

34. The method of claim 23, wherein the radiant energy source is positioned on the side of the storage media having the first layer and is directed towards the detectors which are positioned on the side of the storage media opposite the first layer.

* * * * *